United States Patent [19]

Hasenbein et al.

[11] 3,902,368
[45] Sept. 2, 1975

[54] THERMAL WARNING DEVICE FOR CANNON

[75] Inventors: Richard G. Hasenbein, Albany; Edward J. Ryan, Troy; Louis P. Rigaud, Latham, all of N.Y.

[73] Assignee: The United States of America as represented by the Secretary of the Army, Washington, D.C.

[22] Filed: May 3, 1974

[21] Appl. No.: 466,765

[52] U.S. Cl. ............... 73/343 R; 73/1 F; 73/368.3; 89/135
[51] Int. Cl.[2] ............... G01K 01/16; G01K 05/32; F41D 11/28
[58] Field of Search .......... 73/374, 1 F, 368.3, 419, 73/343 R; 74/89.15; 89/135, 14 A; 116/129 R, 136.5, 129 AB

[56] References Cited
UNITED STATES PATENTS

| | | | |
|---|---|---|---|
| 2,582,146 | 1/1952 | Moore | 73/419 X |
| 3,103,818 | 9/1963 | Pflierger | 73/368.3 |
| 3,216,244 | 11/1965 | Borchers | 73/419 X |
| 3,237,454 | 3/1966 | Gray, Jr. | 73/419 |
| 3,429,291 | 2/1969 | Hoffman | 73/419 |
| 3,434,351 | 3/1969 | Poitras | 73/368.3 |
| 3,504,543 | 4/1970 | Cutting | 89/135 X |

*Primary Examiner*—Richard C. Queisser
*Assistant Examiner*—Daniel M. Yasich
*Attorney, Agent, or Firm*—Robert P. Gibson; Nathan Edelberg

[57] ABSTRACT

The surface temperature of a large caliber gun tube can be mechanically determined by a mercury-filled sensing element fixed thereto in communication with a mercury-filled capillary tube extending into a housing also fixed to the gun tube surface for supporting a rearwardly facing arcuate temperature scale in position for visual observation. The expansion or contraction of the mercury in the sensing element and the capillary tube is utilized to impart linear displacement to an actuating rod slidably mounted in the housing in engagement with a pivotal indicator in radial alignment with the temperature scale.

8 Claims, 8 Drawing Figures

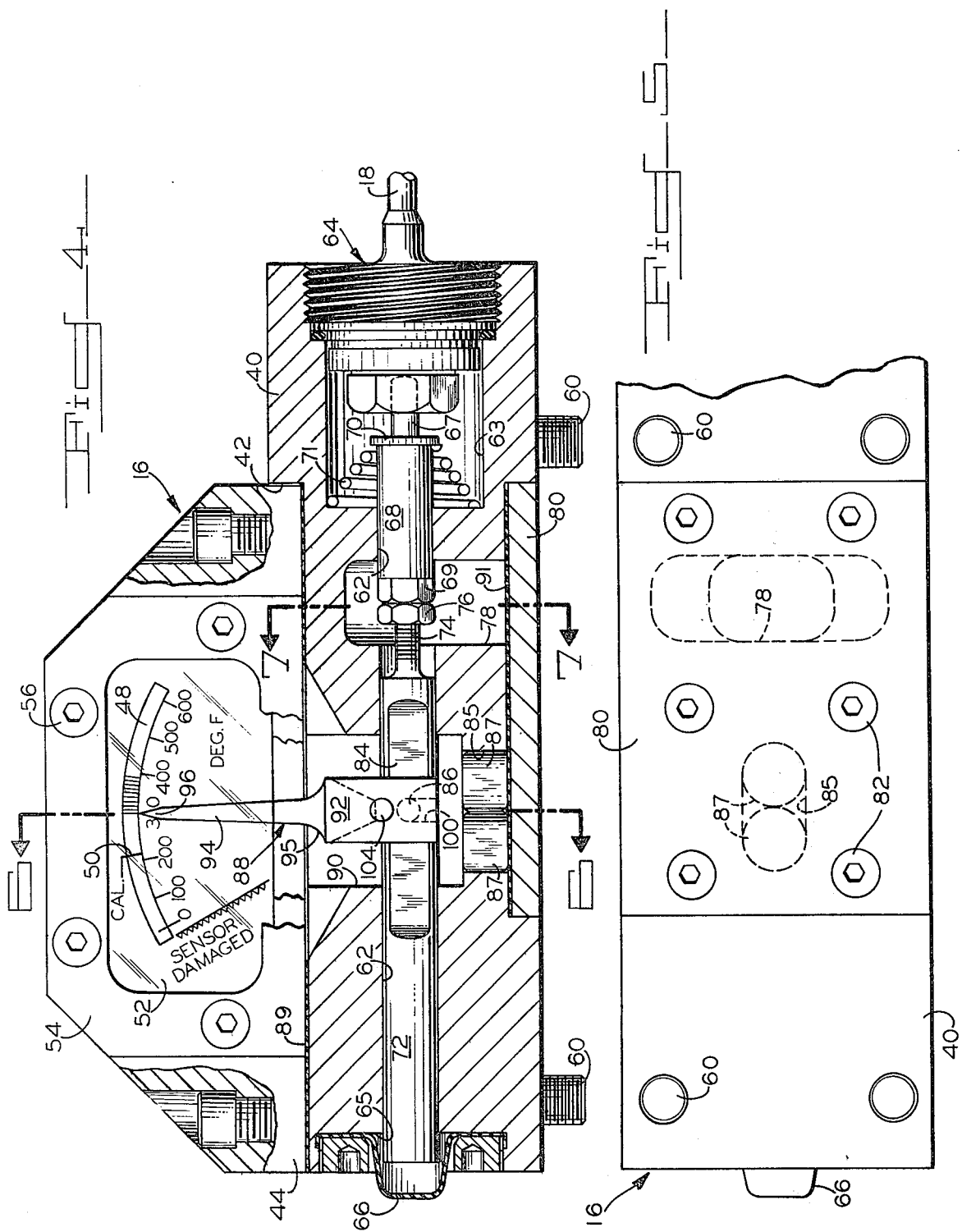

3,902,368

THERMAL WARNING DEVICE FOR CANNON

BACKGROUND OF THE INVENTION

This invention relates to means for mechanically sensing changes in temperature of an arcuate surface and is more particularly directed to a device for visually indicating the exterior surface temperature of a large caliber gun tube at any given point thereon.

While the mobility and firepower of artillery has been significantly improved through the use of thinner tube sections, more powerful propellants, and greater rates of fire, such benefits have been achieved at the expense of higher tube temperatures which invariably increase the hazards to the crew during the loading and firing operations. At present, the temperatures within the firing chambers of gun tube are held to relatively safe levels by reference to statistical tables which set a limit on the number of rounds to be fired consistent with the caliber of the tube and the particular rate of fire employed. These limits are generally on the conservative side since they do not take into account all of the variables which affect tube temperature. Thus, in most instances, the useful life of a gun tube is never fully attained with a consequent loss in efficiency and economy of operation.

It is therefore an object of this invention to provide an unusually rugged device which can be securely mounted on the breech end of a large caliber gun tube to sense the surface temperature thereof in a highly accurate and reliable fashion despite the extremely large recoil forces to which the tube is ordinarily subjected during firing.

Another object of the present invention is to provide a temperature-sensing device, as aforesaid, which will continuously monitor the operating temperature of the gun tube and which is completely mechanical in operation thereby eliminating the need for any external source of power.

A further object of this invention lies in the provision of a thermal warning device, as aforesaid, which responds to the expansion or contraction of a column of mercury fixed to exterior surface of the gun tube in the area of interest to provide a visual indication of all changes in the temperature thereof.

Still another object of the present invention is to provide a thermal warning device, as aforesaid, wherein the linear movement imparted to the actuating piston by the expansion or contraction of the mercury column is converted into an amplified pivotal movement of the temperature indicator in a manner unaffected by the relatively high recoil forces generated during the firing of the gun.

An additional object of this invention is to provide a thermal warning device, as aforesaid, wherein the column of mercury is mounted on the exterior surface of the gun tube to provide a maximum transfer of heat thereto.

SUMMARY OF THE INVENTION

It has been found that the foregoing objects can be accomplished by a device fixed to the exterior periphery of the gun tube at the breech end thereof and arranged to receive the end of a plunger slidably responsive to the linear contraction and expansion of a column of mercury in the manner shown and described in U.S. Pat. No. 3,103,818 to Charles W. Pflieger. One end of the mercury column terminates in a cylindrical element embedded in a thermally conductive epoxy so as to expose only the surface required to provide line contact with the exterior surface of the gun tube when fastened thereto in parallel relation to the bore axis thereof at the area corresponding to the origin of rifling therein. Linear displacement of the plunger is axially transmitted to a slidable rod arranged to actuate a pivotal indicator so that the upper end thereof passes through an arc coextensive with the temperature indicia on a fixed scale mounted within the device. In order to adequately withstand the extremely high forces imparted to the pivotal indicator during the firing of the gun, the opposite sides of the slidable rod are vertically slabbed and the lower end of the indicator is suitably bifurcated to straddle the slabbed sides of the rod for pivotal movement relative thereto. The indicator is pivoted between a pair of fixed pins and the slidable rod is provided with a fixed transverse pin therethrough disposed immediately below and parallel to the pivot pins to project beyond the slabbed sides into corresponding recesses extending upwardly into the bifurcated lower end of the pivotal indicator. Thus, as the rod is linearly displaced by the actuating plunger to pivot the indicator in direct response to the expansion or contraction of the column of mercury, the degree of pivotal movement imparted to the indicator is inversely proportional to the vertical distance between the pivot point thereof and the axis of the transverse pin in the rod.

BRIEF DESCRIPTION OF THE DRAWING

FIG. 4 is an elevational view of the indicator assembly with the lower portion thereof in vertical section;

FIG. 5 is a plan view of the underside of the indicator housing;

DESCRIPTION OF A PREFERRED EMBODIMENT

Figure 1:
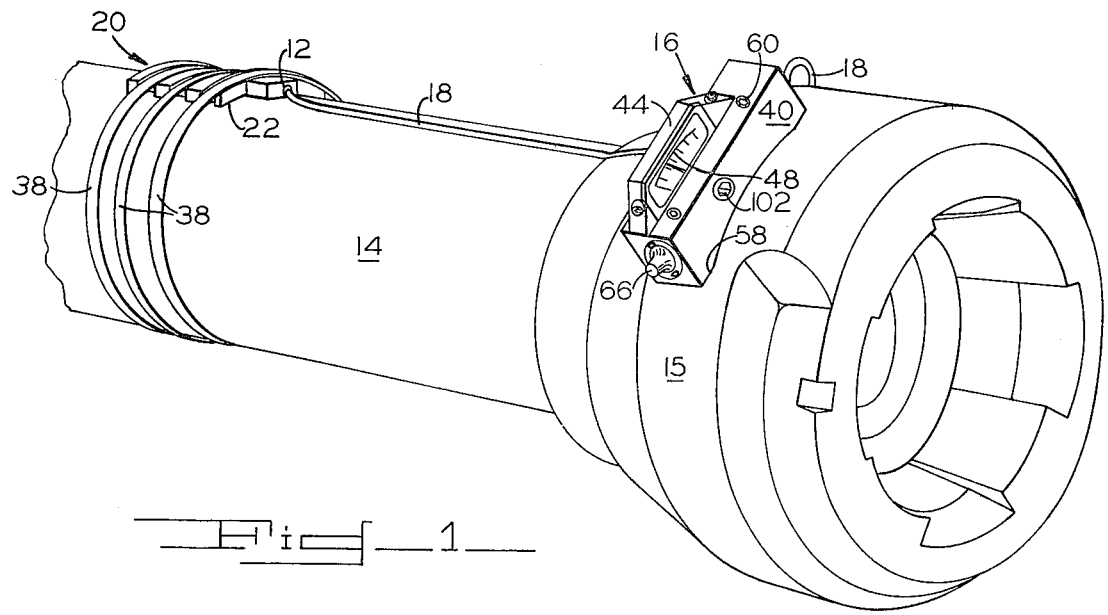
FIG. 1 is a perspective view of the device of the present invention in operative position on the breech end of a gun tube.

As best shown in FIG. 1, the device of the present invention essentially comprises a mercury-filled element 12 disposed in thermal contact with the exterior periphery of a gun tube 14, a temperature-indicating assembly 16 secured to a breech mechanism 15 on the rear end of tube 14 and a mercury-filled capillary tube 18 connecting element 12 to assembly 16.

Figure 2:
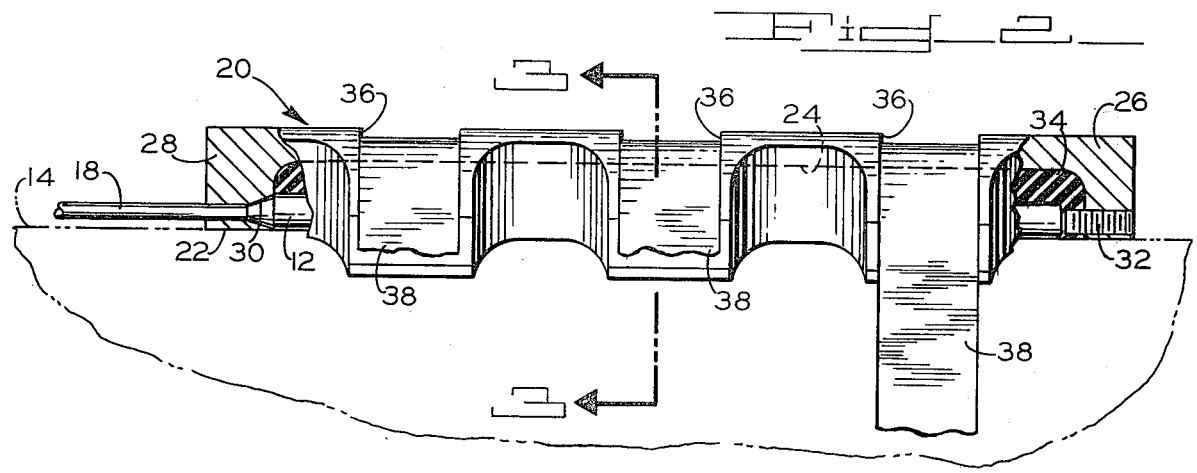
FIG. 2 is an elevational view of the clamp with the ends thereof partially cut away to show the manner in which the mercury-filled element is retained in thermal contact with the surface of the gun tube.
Figure 3:
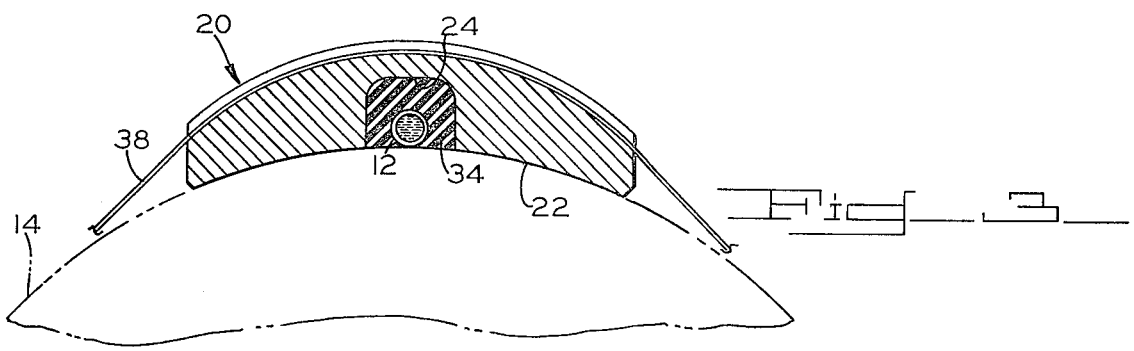
FIG. 3 is a vertical section taken along line 3—3 in FIG. 2.

As best shown in FIG. 2, element 12 is preferably formed as a closed-end tube of larger diameter than capillary tube 18 and is disposed in line contact with the exterior periphery of gun tube 14 along an axis parallel to the bore axis thereof at an area coextensive with that portion of the bore in which the origin of rifling (not shown) is located. This is accomplished by a clamp 20 having an arcuate underside 22 corresponding to the peripheral contour of gun tube 14, as best shown in FIG. 3, and a longitudinal recess 24 extending upwardly into underside 22 to form front and rear endwalls 26 and 28 respectively. The open end of element 12 is conically tapered at the area of engagement with capillary tube 18 to fit into a mating opening 30 in rear endwall 28 of clamp 20 and, when thus assembled, a threaded stud 32 projecting inwardly from front endwall 26 contacts the forward end of element 12, as shown in FIG. 2, to retain the latter in place. The space between element 12 and the interior wall surfaces of recess 24 is filled, as indicated at 34, by a thermally conductive epoxy. Clamp 20 is also provided with a plurality of spaced apart peripheral grooves 36 for seating a corresponding number of adjustable bands 38 whwich can be suitably tightened to retain element 12 against movement relative to gun tube 14.

Temperature-indicating assembly 16 includes a rectangular housing 40 having a longitudinal slot 42 centrally formed in the top surface thereof to receive a generally rectangular insert 44 provided with rearwardly facing stepped opening 46. Inscribed on the rear wall surface of opening 46 is an arcuate temperature scale 48 covering a range of 0° – 600 F preferably divided into six equal increments of 100° each, the distance between the 300° and 400° divisions being further divided into units of 10° each, as shown in FIG. 4. Also included on scale 48 is an index mark 50 corresponding to the boiling point of water (212°F) which is utilized for calibration pruposes as will be more fully explained hereinafter. Spaced rearwardly of scale 48 is a protective cover 52 of a transparent plastic material, such as Lexan, which is, in turn, retained in the rearmost and larger stepped portion of opening 46 by a suitably apertured plate 54 fastened to insert 44 by screws 56.

Housing 40 is seated in a chordal slot 58 located adjacent the rear end of breech mechanism 15 and is securely retained therein by vertical screws 60. A central bore 62 extends through housing 40 to terminate in a counterbore 63 at one end thereof for threadably receiving the piston-cylinder unit 64 to which capillary tube 18 is connected. The opposite end of bore 62 is also counterbored, as at 65, to fixedly receive a flexible diaphragm 66 arranged to normally protrude from housing 40 in sealing cooperation with bore 62.

As more fully shown and described in the aforementioned patent to Charles W. Pflieger, the mercury column in capillary tube 18 extends into the interior of unit 64 in position to contact the stem portion 67 of a slidable plunger 68. In the present invention, plunger 68 extends beyond counterbore 63 into bore 62 to terminate in a hexagonal end 69 and is provided at the opposite end thereof with a flange 70 disposed to receive the thrust of a spring 71 seated against the interior end wall of counterbore 63. Thus, when the mercury column expands, plunger 68 is axially displaced against the bias of spring 71 and when the mercury column contracts, plunger 68 is correspondingly displaced to maintain stem portion 67 in abutment with the mercury column in unit 64.

An actuating rod 72 is slidably seated in bore 62 and is provided with a reduced diameter end 74 threaded into the hexagonal end of plunger 68. Once the desired relationship between plunger 68 and rod 72 has been attained, rotation of plunger 68 is prevented by an adjacent locknut 76. In order to permit rotation of plunger 68 and locknut 70 by a suitable wrench, housing 40 is provided with an upwardly sloped access opening 78 which is normally closed by a cover plate 80 removably secured to the underside of housing 40 by suitable screws 82. Rod 72 is vertically slabbed on opposite sides thereof, as indicated at 84, and is provided with a fixed pin 86 extending transversely therethrough to project beyond the exterior periphery of rod 72 on both sides thereof for engagement with a pivotal indicator 88 arranged to align with the graduations on scale 48 in accordance with the temperature sensed by element 12. In order to accommodate indicator 88, housing 40 is provided with a rectangular opening 90 in vertical intersection with bore 62. Opening 90 is extended through housing 40 to provide a chamber 85 for a suitable desiccant material 87 which is held in place by cover plate 80 to absorb any moisture within the interior of housing 40 which might cause fogging of transparent cover 52. In order to minimize the entry of moisture into the interior of housing 40, insert 44 and cover plate 80 are assembled thereto with suitable gaskets 89 and 91, respectively, as best shown in FIG. 4.

Figures 6, 7:
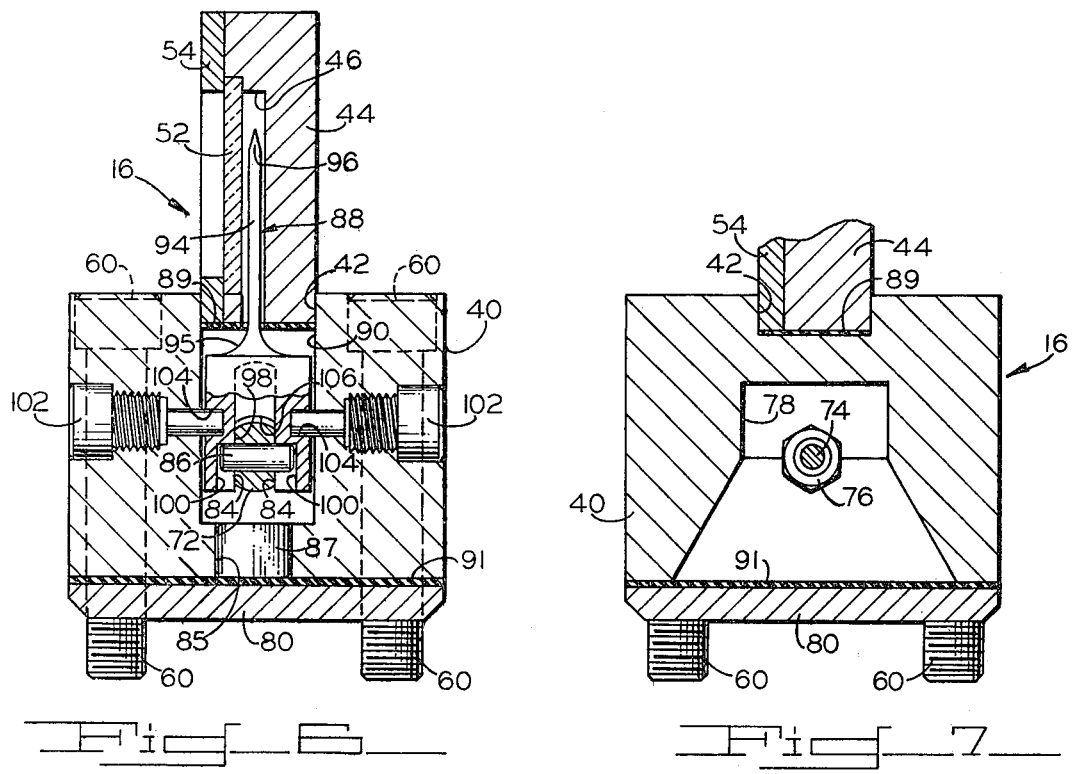
FIG. 6 is a section taken along line 6—6 in FIG. 4.
FIG. 7 is a section taken along line 7—7 in FIG. 4.
Figure 8:
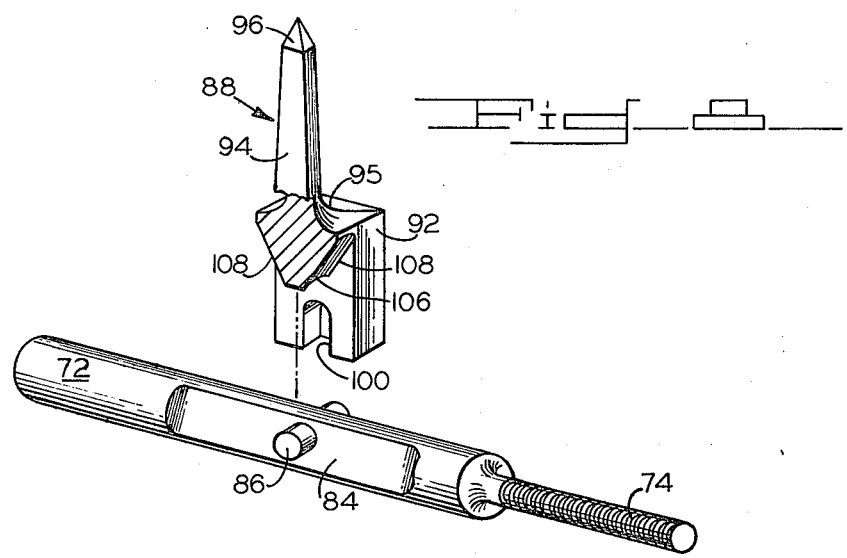
FIG. 8 is an exploded view of the indicator and the actuating rod with the former partially cut away to show the interior configuration thereof.

Indicator 88 is formed with a rectangular body 92 and a tapered arm 94 is integrally blended thereto, as at 95, to terminate in a needle end 96. The lower end of body 92 is bifurcated by a vertical slot 98 which, as best shown in FIG. 8, is transversely extended into the opposite sidewalls thereof to form downwardly-opening U-shaped recesses 100 therein. Thus, when indicator 88 is lowered into opening 90 to bring U-shaped recesses 100 into engagement with the protruding ends of transverse pin 86, the sidewalls formed by slot 98 will straddle slabbed sides 84 of actuating rod 72 in slidable contact therewith. Indicator 88 can therafter be pivotally retained in this position by stepped pins 102 threadably mounted in opposite sides of housing 40 in position to be advanced into rectangular opening 90 to engage in mating holes 104 formed into the exterior of body 92 at right angles to the longitudinal axis of bifurcating slot 98. The upper end of slot 98 is provided with an arcuate wall surface 106 intersected at both sides thereof by converging cuts forming clearance surfaces 108. The height of slot 98 is slightly greater than the diameter of actuating rod 72 so that when indicator 88 is pivotally mounted is housing 40, arcuate wall surface 106 is concentrically spaced from the exterior of rod 72, as best shown in FIG. 6, to provide clearance for the pivotal movement of indicator 88.

As a result of the foregoing structure, the ratio between the displacement of rod 72 and the pivotal movement of indicator 88 can be varied simply by changing the vertical location of pivot holes 104 therein relative to the axis of transverse pin 86. For example, if an increase in the size of scale 48 requires a correspondingly greater pivotal movement of indicator 88, this can be obtained by changing the location of pivot holes 104 to reduce the distance between the pivot point of indicator 88 and the displacement axis of rod 72. In the event of a decrease in the arcuate extent of scale 48, the vertical distance between pivot point of indicator 88 and the displacement axis of rod 74 will increased accordingly.

Moreover, the parts are so arranged that the pivotal movement of indicator 88 can be readily calibrated in accordance with the actual response of the mercury column to changes in temperature. This is accomplished, once cover plate 80 is removed, by first unloosening locknut 76 and thereafter inserting element 12 into boiling water. Thereupon, plunger 68 can be rotated by a wrench or other similar tool in the direction which will displace actuating rod 72 relative thereto to the extent required to pivot point arm 94 into alignment with index mark 50 on temperature scale 48.

Furthermore, in addition to the sealing function thereof, flexible diaphragm 66 also provides two other desirable features. In the event spring 71 fails to maintain proper contact between plunger 68 and the end of the mercury column during the contraction thereof, this may be corrected by manually pushing diaphragm 66 against the end of rod 72 to transmit the necessary restoration movement to plunger 68. Also, the operability of the device may be tested at any time by pushing diaphragm 66 against the end of rod 72 while observing indicator 88 for possible movement which would indicate some malfunction of the moving parts or leakage of the mercury column.

Thus, there is here provided a completely mechanical device for continuously sensing the temperature of the arcuate periphery of a gun tube at the particular area in radial alignment with the origin of the rifling in the firing chamber. The device provides highly accurate and reliable temperature readings even under the high vibrational forces and inertial loads (often up to 300 gravities) normally encountered during the recoil cycle of large caliber gun tubes. The ability to withstand these detrimental forces is essentially due to the structural strength afforded by the cooperating engagement between the bifurcated lower end of the indicator needle and the slabbed sides of the actuating rod as well as the extremely rugged construction of the entire indicator itself. Furthermore, the easy visibility of the temperature scale, which may be suitably color coded, provides a clear warning of the extent of the temperature within the firing chamber thereby permitting the gun crew to control the loading of the ammunition into the gun tube so as to prevent the danger of premature detonation thereof, commonly referred to as "cook-off".

The foregoing disclosure and description of the invention is illustrative only. Various changes may be made within the scope of the appended claims without departing from the spirit of the invention.

We claim:

1. A device for continuously indicating the surface temperature of a given area on a large caliber gun tube subject to reciprocal recoil movement, comprising,
   a mercury-filled sensing element fixed in thermal contact with the exterior surface of the gun tube along a line parallel to the recoil axis thereof,
   a housing fixedly mounted on the gun tube in spaced relation to said sensing element,
   an arcuate temperature scale extending upwardly from said housing in position for visual observation,
   an actuating rod slidably disposed within said housing for movement in a direction transverse to the recoil axis of the gun tube, said rod having a fixed pin projecting outwardly from the opposite sides thereof in parallel alignment with the recoil axis of the gun tube,
   an indicator pivotally supported within said housing against movement in any direction other than about an axis parallel to the recoil axis of the gun tube, said indicator having one end in pivotal engagement with said fixed pin on said actuating rod and the other end extending upwardly from said housing in parallel relation with said temperature scale, and
   a mercury-filled capillary tube extending from said sensing element into said housing for imparting longitudinal movement to said actuating rod in response to the thermal movement of the mercury whereby said fixed pin thereon pivots said indicator relative to said temperature scale for visually indicating the surface temperature of the gun tube in the area coextensive with said sensing element.

2. The device as defined in claim 1 including a flexible diaphragm secured to said housing adjacent the end of said actuating rod remote from said capillary tube whereby any pivotal movement of said indicator along said temperature scale in response to manual displacement of said diaphragm against the adjacent end of said actuating rod signals the possibility of mercury leakage or other malfunction in converting longitudinal movement of said actuating rod into pivotal movement of said indicator.

3. The device as defined in claim 1 including,
   a plunger having one end responsive to thermal movement of the mercury in said capillary tube and the other end thereof disposed in adjustable threaded engagement with the adjacent end of said actuating rod,
   spring means normally biasing said plunger toward said capillary tube to maintain contact with the mercury therein during the thermal contraction thereof,
   an index mark on said temperature scale representative of the temperature of boiling water, and
   means for adjusting the relative positions of said actuating rod and said plunger to bring said indicator into calibrated alignment with said index mark when the temperature of said sensing element is maintained at the boiling point of water.

4. The device as defined in claim 1 wherein the end of said indicator remote from said temperature scale is bifurcated for the slidable passage of said actuating rod therethrough whereby said indicator is free to pivot about the transverse axis thereof but is restrained against bending movement in a plane at right angles to the longitudinal axis of said rod.

5. The device as defined in claim 1 including,
   an arcuate clamp having a thermally conductive epoxy in the underside thereof for positioning said sensing element in line contact with the exterior surface of the gun tube, and
   means for locking said clamp against movement relative to the gun tube.

6. In a thermal warning device for continuously indicating the surface temperature of a given area on the exterior surface of a large caliber gun tube subject to reciprocal recoil movement, the combination of,
   a mercury-filled sensing element fixed in thermal contact with the exterior surface of the gun tube,
   a housing fixed to the gun tube rearwardly of said sensing element,
   an arcuate temperature scale extending upwardly from said housing for visual observation,
   an actuating rod slidably disposed in said housing for movement in a direction transverse to the recoil axis of the gun tube, said rod having vertically slabbed surfaces on the opposite sides thereof and a transverse pin projecting through said slabbed surfaces, means for imparting slidable movement to said rod in response to the expansion and contraction of the mercury in said sensing element, and an indicator mounted in said housing for pivotal movement about an axis parallel to said transverse pin, one end of said indicator extending into radial alignment with said temperature scale and the opposite end of said indicator having a downwardly opening bifurcated slot for straddling engagement with said slabbed surfaces on said slidable rod, the lower portion of said slot having laterally extending U-shaped recesses engageable with the projecting ends of said transverse pin whereby the slidable movement of said rod pivots said indicator through an arc on said temperature scale in correspondence with the thermal displacement of the mercury in said sensing element.

7. The thermal warning device defined in claim 6 wherein said indicator includes opposing clearance cuts communicating with said bifurcated slot therein to provide for the full pivotal movement of said indicator.

8. The thermal warning device defined in claim 6 wherein the pivotal movement of said indicator is inversely proportional to the vertical distance between the pivot axis thereof and said transverse pin on said actuating rod.

* * * * *